US011191404B2

(12) United States Patent
Hyun et al.

(10) Patent No.: US 11,191,404 B2
(45) Date of Patent: Dec. 7, 2021

(54) CLEANER

(71) Applicant: LG ELECTRONICS INC., Seoul (KR)

(72) Inventors: Kietak Hyun, Seoul (KR); Sangchul Lee, Seoul (KR); Jonguk Her, Seoul (KR)

(73) Assignee: LG Electronics Inc., Seoul (KR)

(*) Notice: Subject to any disclaimer, the term of this patent is extended or adjusted under 35 U.S.C. 154(b) by 0 days.

(21) Appl. No.: 17/059,303

(22) PCT Filed: May 21, 2019

(86) PCT No.: PCT/KR2019/006078
§ 371 (c)(1),
(2) Date: Nov. 27, 2020

(87) PCT Pub. No.: WO2019/231158
PCT Pub. Date: Dec. 5, 2019

(65) Prior Publication Data
US 2021/0204777 A1    Jul. 8, 2021

(30) Foreign Application Priority Data

May 31, 2018 (KR) ......................... 10-2018-0062625

(51) Int. Cl.
*B01D 50/00* (2006.01)
*A47L 9/16* (2006.01)
(Continued)

(52) U.S. Cl.
CPC ............... *A47L 9/1608* (2013.01); *A47L 5/24* (2013.01); *A47L 9/165* (2013.01); *A47L 9/1683* (2013.01);
(Continued)

(58) Field of Classification Search
CPC .......... A47L 9/1608; A47L 5/24; A47L 9/165; A47L 9/1683; A47L 9/22; A47L 9/16;
(Continued)

(56) References Cited

U.S. PATENT DOCUMENTS 6,334,234 B1 *  1/2002  Conrad ..................... A47L 5/30
                                                            15/347
6,428,589 B1 *  8/2002  Bair ....................... A47L 9/1608
                                                            15/353
(Continued)

FOREIGN PATENT DOCUMENTS

JP    2010-512197 A    4/2010
KR    10-1235891       4/2012
(Continued)

OTHER PUBLICATIONS

PCT International Search Report and Written Opinion, dated Aug. 27, 2019, issued in International Application No. PCT/KR2019/006078 (15 pages).

*Primary Examiner* — Dung H Bui
(74) *Attorney, Agent, or Firm* — Finnegan, Henderson, Farabow, Garrett & Dunner, LLP

(57) ABSTRACT

A cleaner comprising: a housing having the shape of a hollow cylinder, a barrier for dividing the inner space of the housing into an upper space and a lower space; a barrier through-hole provided so as to penetrate the barrier; an intake portion provided on the circumferential surface of the housing; an exhaust portion provided to penetrate the housing; a housing discharge port penetrating the bottom surface of the housing; a cover for closing the housing discharge port; an alien-substance separating portion provided in the lower space so as to provide a channel that guides air introduced to the intake portion to the barrier through-hole; a fan provided to comprise an impeller positioned in the upper space; a rotating shaft to which the impeller is fixed, (Continued)

and a motor for rotating the rotating shaft; and a storage portion provided to be attachable to/detachable from the housing.

8 Claims, 6 Drawing Sheets

(51) Int. Cl.
| | |
|---|---|
| *A47L 5/24* | (2006.01) |
| *A47L 9/22* | (2006.01) |
| *B01D 45/16* | (2006.01) |
| *B04C 5/185* | (2006.01) |
| *B04C 5/28* | (2006.01) |
| *B04C 9/00* | (2006.01) |

(52) U.S. Cl.
CPC ............... *A47L 9/22* (2013.01); *B01D 45/16* (2013.01); *B01D 50/002* (2013.01); *B04C 5/185* (2013.01); *B04C 5/28* (2013.01); *B04C 9/00* (2013.01); *B04C 2009/002* (2013.01); *B04C 2009/005* (2013.01)

(58) Field of Classification Search
CPC ...... B01D 45/16; B01D 50/002; B04C 5/185; B04C 5/28; B04C 9/00; B04C 2009/002; B04C 2009/005
See application file for complete search history.

(56) References Cited

U.S. PATENT DOCUMENTS

| | | | | |
|---|---|---|---|---|
| 6,546,593 | B2* | 4/2003 | Oh | A47L 5/28 15/353 |
| 7,662,201 | B2* | 2/2010 | Lee | A47L 9/165 55/419 |
| 9,211,046 | B2* | 12/2015 | Peace | A47L 9/165 |
| 9,414,730 | B2* | 8/2016 | Robertson | A47L 9/1608 |
| 10,314,447 | B2* | 6/2019 | Conrad | A47L 9/1625 |
| 2005/0198769 | A1* | 9/2005 | Lee | A47L 9/10 15/353 |
| 2005/0198770 | A1* | 9/2005 | Jung | A47L 5/30 15/353 |
| 2006/0037172 | A1* | 2/2006 | Choi | A47L 9/1666 15/353 |
| 2006/0137304 | A1* | 6/2006 | Jeong | B04C 5/12 55/337 |
| 2006/0254226 | A1* | 11/2006 | Jeon | B04C 5/02 55/345 |
| 2007/0199284 | A1* | 8/2007 | Yoo | B01D 45/12 55/345 |
| 2009/0100810 | A1* | 4/2009 | Smith | A47L 9/1641 55/343 |
| 2010/0005617 | A1* | 1/2010 | Hyun | A47L 9/1666 15/347 |
| 2010/0299865 | A1* | 12/2010 | Conrad | A47L 9/165 15/353 |
| 2011/0056045 | A1* | 3/2011 | Sepke | A47L 9/1683 15/347 |
| 2012/0210537 | A1* | 8/2012 | Makarov | A47L 9/1641 15/353 |
| 2014/0082883 | A1* | 3/2014 | Tran | A47L 9/20 15/353 |
| 2014/0196605 | A1* | 7/2014 | Morgan | A47L 9/1683 95/271 |
| 2014/0245562 | A1* | 9/2014 | Conrad | A47L 9/2884 15/323 |
| 2017/0196423 | A1 | 7/2017 | Brown et al. | |
| 2018/0213985 | A1* | 8/2018 | Song | A47L 9/1683 |
| 2018/0338658 | A1* | 11/2018 | Krebs | A47L 9/127 |
| 2018/0368639 | A1* | 12/2018 | Peters | A47L 9/1666 |
| 2019/0090701 | A1* | 3/2019 | Tonderys | A47L 5/225 |
| 2019/0091701 | A1* | 3/2019 | Hyun | A47L 9/1625 |
| 2020/0037834 | A1* | 2/2020 | Li | A47L 9/322 |
| 2020/0214523 | A1* | 7/2020 | Kim | A47L 11/40 |
| 2021/0085147 | A1* | 3/2021 | Yu | A47L 9/165 |

FOREIGN PATENT DOCUMENTS

| | | |
|---|---|---|
| KR | 10-2017-0112911 | 10/2017 |
| KR | 10-2018-0023790 | 3/2018 |

* cited by examiner

CLEANER

TECHNICAL FIELD

The present disclosure relates to a cleaner.

BACKGROUND

A cleaner is an appliance for cleaning the indoor by sucking particles such as dust. It is general that a conventional cleaner comprises a housing provided with an intake unit and an exhaust unit, a fan for moving the air entering the intake unit to the exhaust unit, a separator for separating particles from the air moving by the fan, a battery for supplying a power to the fan, and a handle provided in the housing.

Since the conventional cleaner having the aforementioned structure stores the particles, which are separated from the air, in the housing, the amount of particles that may be stored in the cleaner has been determined by a volume of the housing.

SUMMARY

Technical Problem

An object of the present disclosure is to provide a cleaner that is able to enlarge a space for storing particles in accordance with a user's selection.

Another object of the present disclosure is to provide a cleaner that may minimize a flow resistance of the air (the air separated from particles) discharged from a cyclone forming portion.

Technical Solution

The present disclosure provides a cleaner comprising: a housing having a hollow cylinder shape; a barrier for dividing an inner space of the housing into an upper space and a lower space; a barrier through-hole provided to pass through the barrier such that the upper space and the lower space are communicated with each other; an intake unit provided on a circumferential surface of the housing to communicate the lower space with the outside of the housing; an exhaust unit provided to pass through the housing such that the upper space is communicated with the outside of the housing; a housing outlet communicated with the lower space by passing through a bottom surface of the housing; a cover detachably provided in the housing, closing the housing outlet; a particle separator provided in the lower space, providing a path that guides the air entering the intake unit to the barrier through-hole and moving particles separated from the air by a centrifugal force toward the housing outlet; a fan provided to include an impeller located in the upper space, a rotary shaft to which the impeller is fixed, and a motor for rotating the rotary shaft, moving the air supplied from the barrier through-hole to the exhaust unit; and a storage unit detachably provided in the housing to be replaced with the cover, expanding a volume of the lower space when coupled to the housing.

The particle separator may include chamber bodies provided in a hollow cylinder shape and extended from the barrier to the cover, dividing the lower space into a first chamber communicated with the intake unit and a second chamber communicated with the barrier through-hole; a body barrier dividing the second chamber into a first space communicated with the barrier through-hole and a second space communicated which is not communicated with the barrier through-hole; a communication hole provided to pass through the chamber bodies, communicating the first space with the first chamber; a path body provided as a pipe surrounding the barrier through-hole, having one end fixed to the barrier and the other end located in the second space by passing through the body barrier; a discharge pipe provided as a pipe extended from the barrier through-hole toward the body barrier and located inside the path body; an inlet provided to pass through the path body, guiding the air inside the second chamber to the inside of the path body; and an air flow forming portion provided between the discharge pipe and the path body in a screw shape, rotating the air entering the inlet, inside the path body.

The storage unit may include a storage body provided in a hollow cylinder shape and detachably provided in the housing; a body inlet provided to pass through an upper surface of the storage body and communicated with the housing outlet; and a communication pipe extended from a bottom surface of the storage body toward the body inlet, dividing an inner space of the storage body into a first storage space communicated with the first chamber and a second storage space communicated with the second space.

The present disclosure may further comprise a body sealing unit provided along an edge of the storage body and compressed between the storage body and a lower end of the housing when the body inlet is connected with the housing outlet.

The communication pipe may include a communication pipe body provided in a pipe shape extended from the bottom surface of the storage body toward the body inlet, forming the second storage space; a communication pipe inlet provided on an upper surface of the communication pipe body to allow particles of the second space to enter the second storage space; and a communication pipe sealing unit fixed to a free end of the communication pipe body and compressed between the chamber body and the communication pipe body when the second space is connected with the second storage space.

The present disclosure may further comprise a shaft provided on the circumferential surface of the housing, forming a rotary shaft of the cover and the storage body; a fastening unit provided on the circumferential surface of the housing; a cover first fastening unit provided in the cover and detachable from the shaft; a cover second fastening unit provided in the cover and detachable from the fastening unit; a body first fastening unit provided in the storage body and detachable from the shaft; and a body second fastening unit provided in the storage body and detachable from the fastening unit.

The fan may include a case provided in the upper space, providing a space where the impeller is accommodated; a case intake port provided to pass through one surface of the case headed for the barrier through-hole, allowing the air to enter the case; and a case exhaust port provided to pass through one surface of the case headed for the exhaust unit, discharging the air inside the case.

The present disclosure may further comprise a first filter located between the barrier through-hole and the case intake port to filter the air.

The present disclosure may further comprise a housing through-hole provided to pass through the upper surface of the housing; an upper cover detachably provided in the housing to open or close the housing through-hole and provided with the exhaust port; and a second filter located between the case exhaust port and the upper cover to filter the air, filtering particles smaller than those filtered by the first filter.

The present disclosure provides a cleaner in which path resistance is minimized. That is, the present disclosure provides a cleaner comprising: a housing having a hollow cylinder shape; a barrier for dividing an inner space of the housing into an upper space and a lower space; a barrier through-hole provided to pass through the barrier such that the upper space and the lower space are communicated with each other; an intake unit provided on a circumferential surface of the housing to communicate the lower space with the outside of the housing; an exhaust unit provided to pass through the housing such that the upper space is communicated with the outside of the housing; a fan provided in the upper space to move the air supplied from the barrier through-hole to the exhaust unit; a housing outlet communicated with the lower space by passing through a bottom surface of the housing; a cover detachably provided in the housing, closing the housing outlet; chamber bodies provided in a hollow cylinder shape and extended from the barrier toward the housing outlet, dividing the lower space into a first chamber communicated with the intake unit and a second chamber communicated with the barrier through-hole; a body barrier dividing the second chamber into a first space communicated with the barrier through-hole and a second space communicated which is not communicated with the barrier through-hole; a communication hole provided to pass through the chamber bodies, communicating the first space with the first chamber; a path body provided as a pipe surrounding the barrier through-hole, having one end fixed to the barrier and the other end located in the second space by passing through the body barrier; a discharge pipe provided as a pipe extended from the barrier through-hole toward the body barrier and located inside the path body; an inlet provided to pass through the path body, guiding the air inside the second chamber to the inside of the path body; and an air flow forming portion provided between the discharge pipe and the path body in a screw shape, rotating the air entering the inlet, inside the path body, wherein the fan includes: a case provided in the upper space; an impeller rotatably provided inside the case; a motor fixed to the case, rotating the impeller; a case intake port provided on one surface of the case headed for the barrier through-hole, allowing the air to enter the case; and a case exhaust port provided on one surface of the case headed for the exhaust unit, discharging the air inside the case.

Advantageous Effects

The present disclosure provides a cleaner that is able to enlarge a space for storing particles in accordance with a user's selection.

The present disclosure also provides a cleaner that may minimize a flow resistance of the air (the air separated from particles) discharged from a cyclone forming portion.

DETAILED DESCRIPTION

Hereinafter, the present disclosure will be described with reference to drawings and embodiments, which specifically specify components of the present disclosure but are used to assist understanding of the present disclosure. Also, specific components in the following embodiments may be shown or described by being exaggerated or downsized for convenience of description and understanding. Therefore, the present disclosure is not limited to the embodiments described below, and various corrections and modifications may be made from the embodiments by the person with ordinary skill in the art to which the present disclosure pertains.

Figure 1:
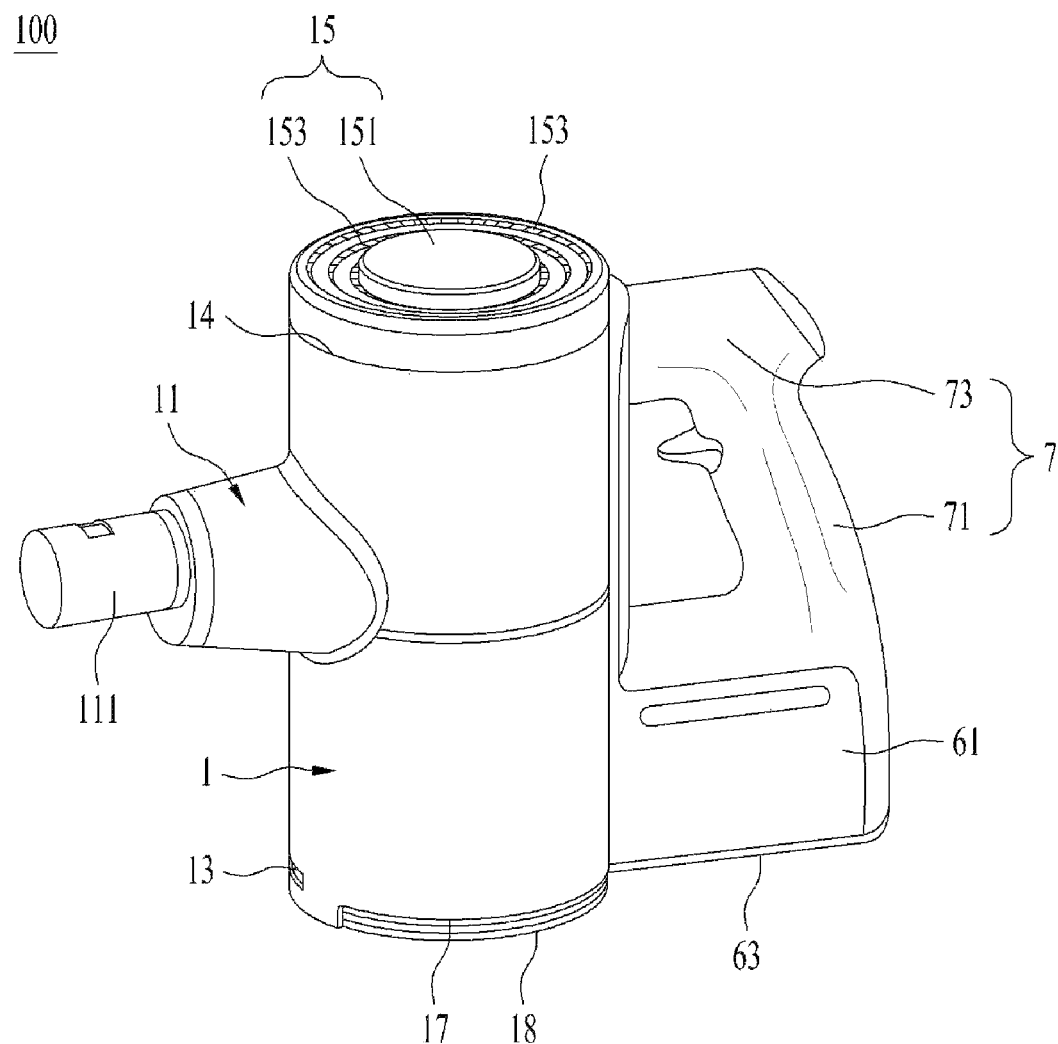
FIG. 1 illustrates an example of a cleaner, consistent with the disclosed embodiments.
Figure 1:
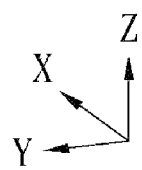
Figure 2:
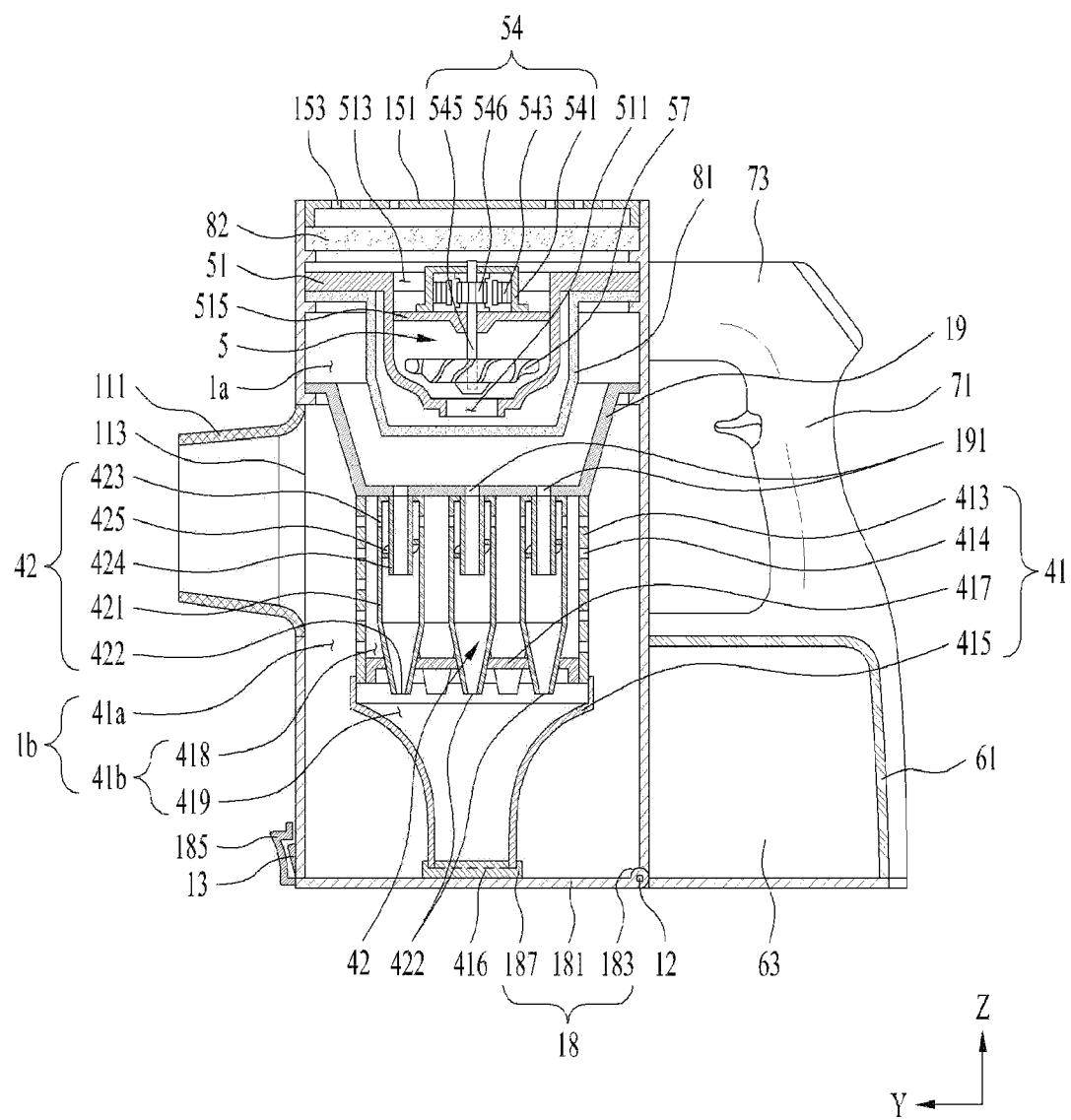
FIG. 2 illustrates an example of a cleaner, consistent with the disclosed embodiments.

FIGS. 1 and 2 illustrate an example of a cleaner 100 according to the present disclosure. The cleaner of the present disclosure comprises a housing 1 provided in a hollow cylinder shape, an intake unit 11 and an exhaust unit 113 provided in the housing 1, a fan 5 (see FIG. 2) provided inside the housing 1, moving the air from the intake unit 11 to the exhaust unit 153, a particle separator 4 (see FIG. 3) guiding the air entering the intake unit 11 to the fan 5 and separating particles from the air by using a centrifugal force, and a handle 7 provided in the housing 1 to allow a user to grip it.

The handle 7 may be provided to be located at a point (point spaced as much as 180°) symmetrical to a point, in which the intake unit 11 is located, from a space provided by a circumferential surface of the housing 1.

As shown in FIG. 2, the housing 1 is provided with a barrier 19 for dividing an inner space of the housing into an upper space 1a and a lower space 1b, wherein the barrier 19 is provided with a barrier through-hole 191 communicating the upper space 1a with the lower space 1b. The barrier through-hole 191 is provided to pass through the barrier.

The intake unit 11 is provided on a circumferential surface of the housing 1 to allow the external air to enter the lower space 1b. The intake unit 11 may include an intake port 113 provided to pass through the circumferential surface of the housing 1, and an intake pipe 111 extended from the intake port 113 toward a direction (direction far away from the handle, Y-axis direction) far away from the center of the housing 1.

Although not shown, the cleaner of the present disclosure may further include an extension pipe detachably provided in the intake pipe 111, and a nozzle provided on a free end of the extension pipe to move particles to the extension pipe.

The exhaust unit 153 is provided to pass through an upper surface or a circumferential surface of the housing 1 and discharges the air inside the housing 1 to the outside. FIG. 2 illustrates an example of a case that the exhaust unit 153 is provided on the upper surface of the housing 1.

A housing through-hole 14 (see FIG. 1) may be provided on the upper surface of the housing 1, and may be provided to be opened or closed by an upper cover 15 (see FIG. 1). As described later, a filter unit for filtering the air may be provided inside the housing such that a user may detach the filtering unit from the housing 1 to clean the filtering unit.

The upper cover 15 may be provided as an upper cover body 151 provided in a shape corresponding to a shape of the housing through-hole 14. In this case, the exhaust unit 153 may be provided as a plurality of holes passing through the upper cover body.

In the case that the exhaust unit 153 is provided on the circumferential surface of the housing 1, the exhaust unit 153 is preferably provided in an area, which is opposite to the position of the handle 7, in a space provided by the circumferential surface of the housing 1. This is to allow the air discharged from the exhaust unit to be prevented from being headed for the handle 7.

A housing outlet 17 (see FIG. 1) for discharging particles stored in the housing 1 to the outside is further provided on a bottom surface (one surface of a first housing located to be opposite to the exhaust unit) of the housing 1, and the housing outlet 17 is opened or closed by a cover 18.

The cover 18 may be provided with a cover body 181 rotatably fixed to the housing 1. In this case, a shaft 12 forming a rotation center of the cover body 181 and a fastening unit 13 facing the shaft 12 may be provided on the circumferential surface of the housing 1, and a cover first fastening unit 183 coupled to the shaft 12 and a cover second fastening unit 185 provided on a free end of the cover body 181 and detachably coupled to the fastening unit 13 may be provided in the cover body 181.

Moreover, a sealing unit 187 compressed between the housing 1 and the cover body 181 when the housing outlet 17 is closed may further be provided in the cover body 181. Preferably, the sealing unit 187 is made of an elastic body such as rubber.

The fan 5 is provided in the upper space 1a of the housing to move the air supplied from the barrier through-hole 191 to the exhaust unit 153, and the particle separator 4 provides a path provided in the lower space 1b of the housing 1 to guide the air entering the intake unit 11 to the fan 5. Particles such as dust contained in the air are separated from the air by a centrifugal force while the particle separator 4 is moving to the fan 5 along the path. A detailed structure of the particle separator is as follows.

The particle separator 4 includes a chamber forming portion 41 for dividing the lower space 1b of the housing into a first chamber 41a and a second chamber 41b, and a cyclone forming portion 42 for forming an air current arousing a centrifugal force while supplying the air inside the second chamber 41b to the fan 5.

The chamber forming portion 41 may include chamber bodies 413 and 415 provided as a cylinder having one end fixed to the barrier 19 and the other end which is in contact with the cover 18, dividing the lower space 1b into two chambers 41a and 41b, and a body barrier 417 for dividing the second chamber 41b formed inside the chamber body into a first space 418 and a second space 419.

The chamber bodies 413 and 415 are divided into a first chamber 41a communicating the lower space with the intake unit 11, and a second chamber 41b communicated with the barrier through-hole 191. The chamber bodies may be provided as a first body 413 fixed to the barrier 19 and a second body 415 fixed to the first body. In this case, the barrier through-hole 191 should be provided to communicate the second chamber 41b with the upper space 1a of the housing. That is, the first body 413 should be provided in a shape surrounding the barrier through-hole 191.

The first body 413 and the second body 415 should be provided in a hollow cylinder shape, and the second body 415 may be provided such that its one end is fixed to a free end of the first body 413 and its other end is in contact with the sealing unit 187 of the cover.

A plurality of communication holes 414 for communicating the first chamber 41a with the first space 418 are provided on a circumferential surface of the first body 413. Therefore, the air entering the first chamber 41a through the intake unit 11 may be supplied to the first space 418 of the second chamber 41b through the communication holes 414.

A discharge port 416 is provided on one surface of the second body 415 which is in contact with the sealing unit 187. The particles stored in the second body 415 are discharged to the outside of the housing 1 through the discharge port 416 when the cover body 181 opens the housing outlet 17.

The body barrier 417 is fixed to any one of the first body 413 and the second body 415 to divide the inside of the second chamber 41b into two spaces 418 and 419. The first space 418 is a space communicated with the barrier through-hole 191, and the second space 419 is a space which is not communicated with the barrier through-hole 191.

Figure 3:
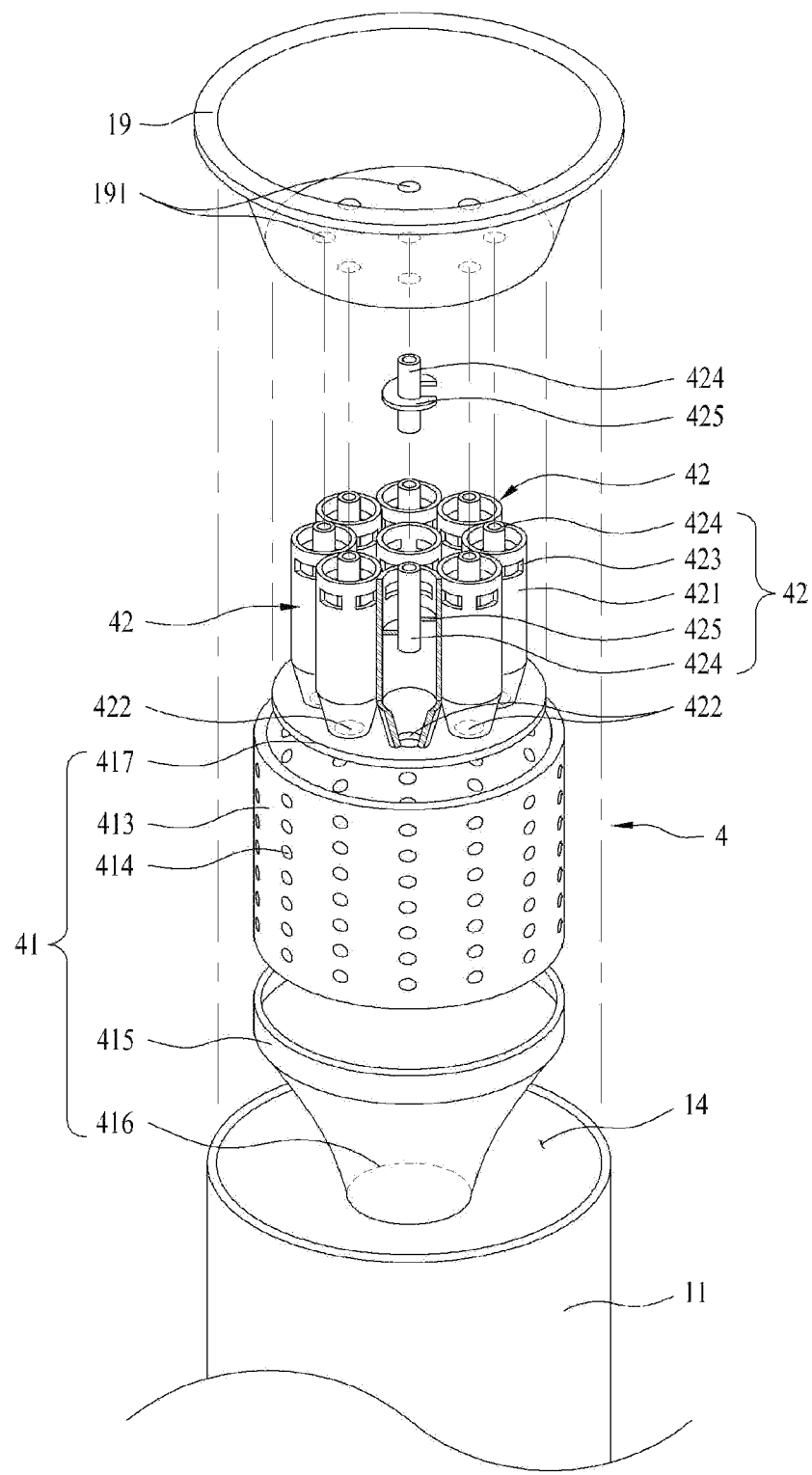
FIG. 3 illustrates an example of a particle separator, consistent with the disclosed embodiments.

As shown in FIG. 3, the cyclone forming portion 42 may include a path body 421 of which one end is fixed to the barrier 19 and the other end is communicated with the second space 419 by passing through the body barrier 417, a discharge pipe 424 located inside the path body 421 and communicated with the barrier through-hole 191, an inlet 423 provided to pass through a circumferential surface of the path body 421, and an air flow forming portion 425 provided between an outer circumferential surface of the discharge pipe 424 and an inner circumferential surface of the path body.

The path body 421 is provided as a pipe surrounding the barrier through-hole 191, and the discharge pipe 424 is located inside the path body 421. The path body 421 is communicated with the second space 419 through a particle discharge port 422 provided one a free end (bottom surface of the path body). The path body 421 may be provided to have a diameter which becomes smaller toward the free end. This is to strongly maintain intensity of the air flow formed in the path body 421.

The air flow forming portion 425 is provided in a screw shape, and the inlet 423 is located to be higher than the air flow forming portion 425. Therefore, the air entering the path body 421 through the inlet 423 when the fan 5 is operated will move (cyclone movement) to be rotated inside the path body 421 in the middle of moving to the discharge pipe 424 through the air flow forming portion 425.

If cyclone movement occurs inside the path body 421, the particles contained in the air move to a rim (the circumferential surface of the path body) of the path by means of a centrifugal force and then will be discharged to the second space 419 by means of gravity.

Unlike the shown drawing, the inlet 423 may be provided as a hole provided to pass through an upper surface of the path body 421. In this case, an upper end of the path body 421 should be provided to be spaced apart from the barrier 19 without being fixed to the barrier 19. Since the path body 421 is fixed to the barrier 19 through the air flow forming portion 425 and the discharge pipe 424, the path body 421 may maintain a state fixed to the barrier 19 even though the upper end of the path body 421 is spaced apart from the barrier 19.

The cyclone forming portion 42 having the aforementioned structure may be provided in a plural number. FIG. 3 illustrates an example of a particle separator 4 provided with nine cyclone forming portions 42.

As shown in FIG. 2, the fan 5 may include a case 51 provided in the upper space 1b of the housing, an impeller 57 rotatably provided inside the case, and a motor 54 fixed to the case, rotating the impeller 57.

The case 51 is provided with a case intake port 511 and a case exhaust port 513, and it is preferable that the case intake port 511 is provided on one surface of the case 51 headed for the barrier through-hole 191 and the case exhaust port 513 is provided to pass through one surface of the case 51 headed for the exhaust unit 153. This is to minimize path resistance between the barrier through-hole 191 and the exhaust unit 153.

The motor 54 is fixed to a support 515 provided in the case 51. FIG. 2 illustrates an example of a case that the support 515 is located between the case intake port 511 and the case exhaust port 513 and a rotary shaft 545 is connected to the impeller 57 by passing through the support 515. That is, the motor 54 may include a fixed unit 541 fixed to the support 515, a stator 543 provided inside the fixed unit, and a permanent magnet 546 fixed to a free end (one end of a rotary shaft located inside the fixed unit) of the rotary shaft 545.

The motor 54 may be provided to be supplied with a power through a power source provided indoor, or may be provided to be supplied with a power through a battery 63 detachably provided in the housing 1. In case of the latter case, a battery housing 61 for providing a space where the battery 63 is accommodated should be provided in the housing 1.

The battery housing 61 may be provided to be protruded from a rear surface (surface located in an opposite direction of a direction where the intake unit is located) of the housing 1 to be far away from the intake unit. In this case, the handle 7 may be provided with a handle body 71 fixed to the battery housing 61 and a connection body 73 connecting the handle body to the circumferential surface of the housing 1.

Meanwhile, for filtering particles which are not removed through the particle separator 4, the present disclosure may further include a filtering unit. The filtering unit further includes at least one of a first filter 81 and a second filter 82. FIG. 2 illustrates an example of a case that the first filter 81 and the second filter 82 are provided in the cleaner 100 of the present disclosure.

The first filter 81 may be located between the barrier through-hole 191 and the case intake port 511 to filter the air, and the second filter 82 may be located between the case exhaust port 513 and the exhaust unit 153 to filter the air.

The first filter 81 and the second filter 82 may be provided to filter particles having the same size, or may be provided to filter particles having different sizes. In the latter case, it is preferable that the second filter 82 filters particles smaller than those filtered by the first filter 81. This is to minimize the amount of fine dust discharged to an indoor space.

Figure 4:
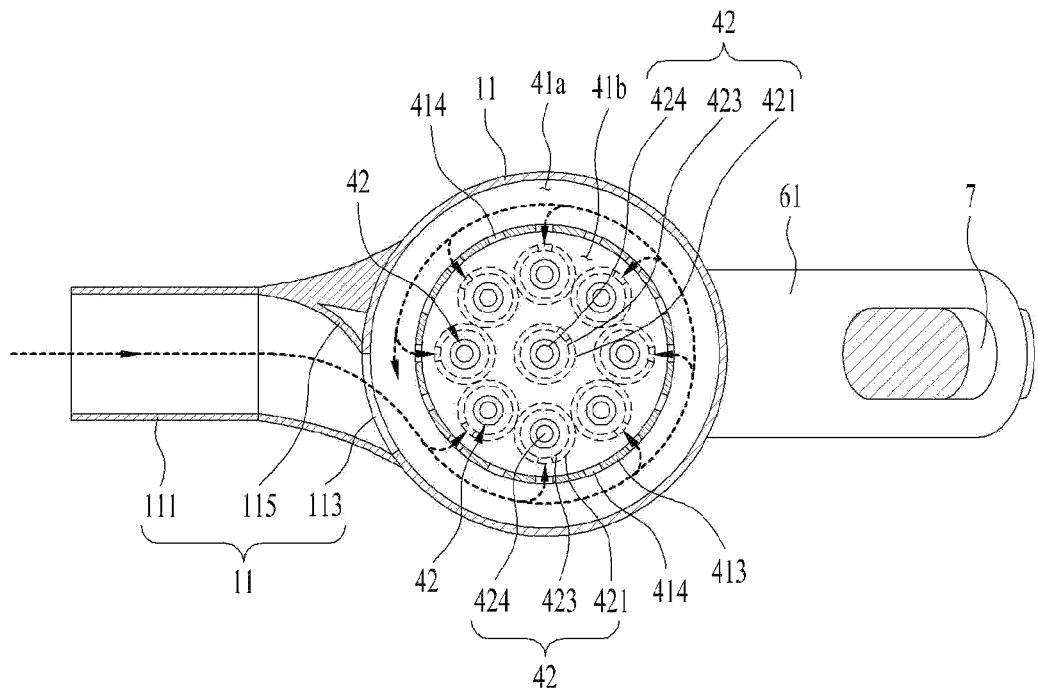
FIG. 4 illustrates an example of a particle separator, consistent with the disclosed embodiments.

Hereinafter, an operation process of the cleaner having the aforementioned structure will be described with reference to FIG. 4.

If a power is supplied to the motor 54 to rotate the impeller 57, the air enters the first chamber 41a through the intake pipe 111 and the intake port 113. A guide 115 for allowing the air discharged from the intake port 113 to enter the first chamber 41a along a tangent direction of a circumferential surface of the first chamber 41a is provided in the intake pipe 111. Therefore, the air entering the first chamber 41a will cyclone move along the circumferential surface of the first chamber 41a.

If the air cyclone moves inside the first chamber 41a, particles will move to the circumferential surface of the first chamber 41a by a centrifugal force and then move to the cover 18 provided on the bottom surface of the housing by gravity, and the air will enter the second chamber 41b through the communication holes 414.

The air entering the second chamber 41b moves to the path body 421 through the inlet 423, and the air entering the path body 421 will cyclone move during the process of passing through the air flow forming portion 425.

If cyclone movement occurs in the path body 421, the particles contained in the air move to the circumferential surface of the path body 421 by a centrifugal force and then are discharged to the second space 419 by gravity, and the air will be discharged to the outside of the housing 1 through the discharge pipe 424, the barrier through-hole 191, the case intake port 511, the case exhaust port 513, and the exhaust unit 153.

A user may remove the particles collected in the second space 419 and the first chamber 41a by rotating the cover 18 to open the housing outlet 17.

Meanwhile, in the cleaner 100 having the aforementioned structure, since the amount of particles that may be stored in the housing 1 is determined by a volume of the housing 1, a problem occurs in that a user should periodically remove particles in the middle of cleaning when cleaning a space where many particles exist.

Figure 5:
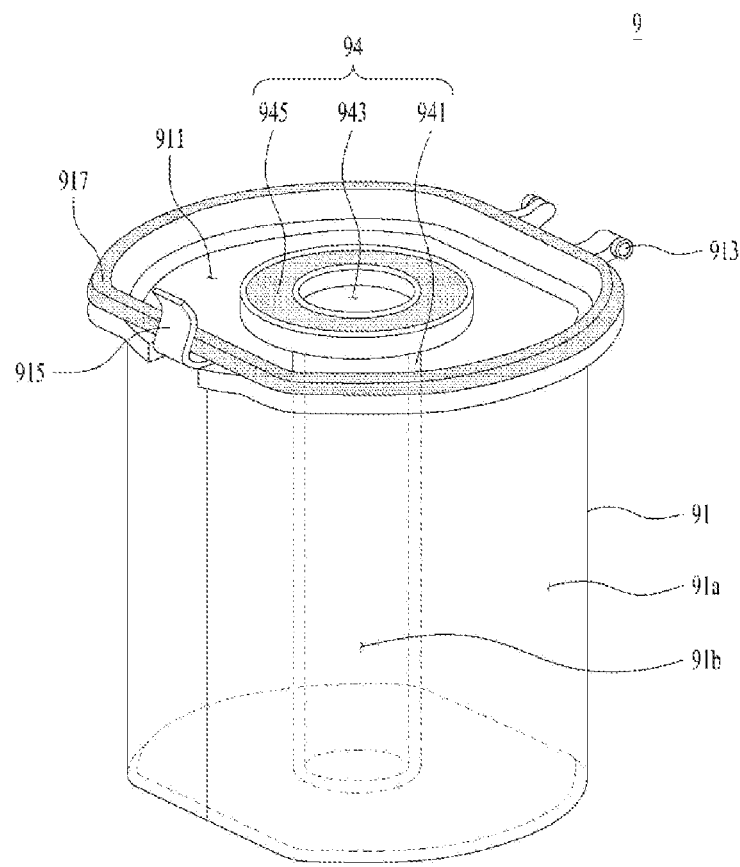
FIG. 5 illustrates an example of a storage unit and a cleaner, consistent with the disclosed embodiments.

To solve this problem, the present disclosure may further comprise a storage unit 9 detachably coupled to the housing 1 to enlarge a space in which the particles are stored. FIG. 5 illustrates an example of the storage unit 9, and the storage unit 9 of FIG. 5 is characterized in that it may detachably be provided in the housing 1 and thus may be replaced with the cover 18.

As shown in FIG. 5, the storage unit 9 includes a storage body 91 provided in a hollow cylinder shape and detachably provided in the housing 1, and a communication pipe 94 extended from a bottom surface of the storage body 91 toward an upper surface of the storage body, dividing an inner space of the storage body 91 into a first storage space 91a communicated with the first chamber 41a and a second storage space 91b communicated with the second space 419.

The storage body 91 is provided with a body inlet 911 provided to pass through an upper surface and communicated with the housing outlet 17. A body first fastening unit 913 detachably coupled to the shaft 12 provided in the housing and a body second fastening unit 915 detachably coupled to the fastening unit 13 are provided on a circumferential surface of the storage body 911.

The body first fastening unit 913 may be provided in the same structure as that of the cover first fastening unit 183, and the body second fastening unit 915 may be provided in the same structure as that of the cover second fastening unit 185. Therefore, the user may connect the storage body 91 to the housing 1 after detaching the cover 18 from the housing 1.

The communication pipe 94 includes a communication pipe body 941 provided in a pipe shape extended from the bottom surface of the storage body 91 toward the body inlet 911, forming the second storage space 91b, and a communication pipe inlet 943 provided on an upper surface of the communication pipe body 941 to allow particles of the second space 419 to enter the second storage space 91b.

The storage body 91 may be provided with a body sealing unit 917 to prevent the air from being discharged through a connection portion of the storage unit 9 and the housing 1, and the communication pipe 94 may further be provided with a communication pipe sealing unit 945.

Figure 6:
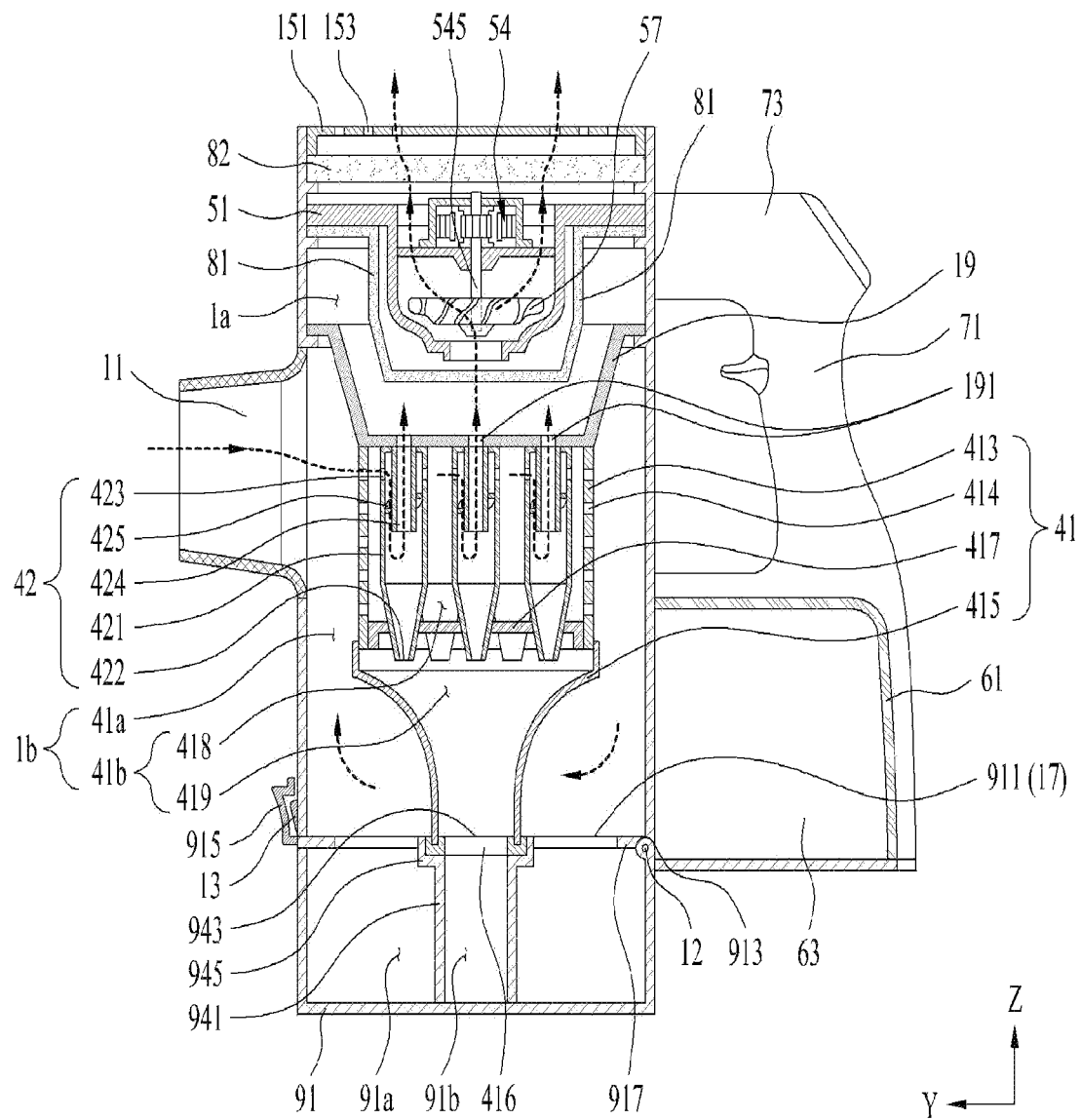
FIG. 6 illustrates an example of a storage unit and a cleaner, consistent with the disclosed embodiments.

As shown in FIG. 6, the body sealing unit 917 may be provided as an elastic body (rubber, etc.) provided along an edge (edge of the body inlet) of the storage body 91. In this case, the body sealing unit 917 will be compressed between the storage body 911 and a lower end of the housing 1 when the body inlet 911 is connected to the housing outlet 17.

The communication pipe sealing unit 945 may be fixed to a free end of the communication pipe body 941, and may be provided to be compressed between the second body 415 and the communication pipe body 941 when the second space 419 and the second storage space 91b are connected with each other. In this case, the communication pipe sealing unit 945 is preferably provided as an elastic body such as rubber.

The user may close the housing outlet 17 by coupling the cover 18 to the housing 1 if necessary (see FIG. 2), or may close the housing outlet 17 by coupling the storage unit 9 to the housing 1 (see FIG. 6).

In the case that the storage unit 9 is coupled to the housing 1, particles separated from the air by cyclone movement inside the first chamber 41a will be stored in the first storage space 91a, and particles separated from the air by cyclone movement inside the second chamber 41b will be stored in the second storage space 91b. Therefore, the present disclosure may solve the problem that the particles stored in the housing 1 should be removed periodically in the middle of cleaning.

In the case that cleaning is completed, the user may remove the particles stored in the storage unit 9 after detaching the storage unit 91 from the housing 1.

It will be apparent to those skilled in the art that the present disclosure may be embodied in other specific forms without departing from the spirit and essential characteristics of the invention. Thus, the above embodiments are to be considered in all respects as illustrative and not restrictive. The scope of the invention should be determined by reasonable interpretation of the appended claims and all change which comes within the equivalent scope of the invention are included in the scope of the invention.

What is claimed is:

1. A cleaner comprising:
   a housing having a hollow cylinder shape;
   a barrier for dividing an inner space of the housing into an upper space and a lower space;
   a barrier through-hole provided to pass through the barrier such that the upper space and the lower space are communicated with each other;
   an intake unit provided on a circumferential surface of the housing to communicate the lower space with the outside of the housing;
   an exhaust unit provided to pass through the housing such that the upper space is communicated with the outside of the housing;
   a housing outlet communicated with the lower space by passing through a bottom surface of the housing;
   a cover detachably provided in the housing, closing the housing outlet;
   a particle separator provided in the lower space, providing a path that guides the air entering the intake unit to the barrier through-hole and moving particles separated from the air by a centrifugal force toward the housing outlet, wherein the particle separator includes:
      chamber bodies provided in a hollow cylinder shape and extended from the barrier to the cover, dividing the lower space into a first chamber communicated with the intake unit and a second chamber communicated with the barrier through-hole;
      a body barrier dividing the second chamber into a first space communicated with the barrier through-hole and a second space communicated which is not communicated with the barrier through-hole;
      a communication hole provided to pass through the chamber bodies, communicating the first space with the first chamber;
      a path body provided as a pipe surrounding the barrier through-hole, having one end fixed to the barrier and the other end located in the second space by passing through the body barrier;
      a discharge pipe provided as a pipe extended from the barrier through-hole toward the body barrier and located inside the path body;
      an inlet provided to pass through the path body, guiding the air inside the second chamber to the inside of the path body; and
      an air flow forming portion provided between the discharge pipe and the path body in a screw shape, rotating the air entering the inlet, inside the path body;
   a fan provided to include an impeller located in the upper space, a rotary shaft to which the impeller is fixed, and a motor for rotating the rotary shaft, moving the air supplied from the barrier through-hole to the exhaust unit; and
   a storage unit detachably provided in the housing to be replaced with the cover, expanding a volume of the lower space when coupled to the housing, wherein the storage unit includes:
      a storage body provided in a hollow cylinder shape and detachably provided in the housing;
      a body inlet provided to pass through an upper surface of the storage body and communicated with the housing outlet; and
      a communication pipe extended from a bottom surface of the storage body toward the body inlet, dividing an inner space of the storage body into a first storage space communicated with the first chamber and a second storage space communicated with the second space.

2. The cleaner of claim 1, further comprising a body sealing unit provided along an edge of the storage body and compressed between the storage body and a lower end of the housing when the body inlet is connected with the housing outlet.

3. The cleaner of claim 1, wherein the communication pipe includes:
   a communication pipe body provided in a pipe shape extended from the bottom surface of the storage body toward the body inlet, forming the second storage space;
   a communication pipe inlet provided on an upper surface of the communication pipe body to allow particles of the second space to enter the second storage space; and
   a communication pipe sealing unit fixed to a free end of the communication pipe body and compressed between the chamber body and the communication pipe body when the second space is connected with the second storage space.

4. The cleaner of claim 1, further comprising:
   a shaft provided on the circumferential surface of the housing, forming a rotary shaft of the cover and the storage body;
   a fastening unit provided on the circumferential surface of the housing;
   a cover first fastening unit provided in the cover and detachable from the shaft;

a cover second fastening unit provided in the cover and detachable from the fastening unit;

a body first fastening unit provided in the storage body and detachable from the shaft; and a body second fastening unit provided in the storage body and detachable from the fastening unit.

5. The cleaner of claim 1, wherein the fan includes:

a case provided in the upper space, providing a space where the impeller is accommodated;

a case intake port provided to pass through one surface of the case headed for the barrier through-hole, allowing the air to enter the case; and a case exhaust port provided to pass through one surface of the case headed for the exhaust unit, discharging the air inside the case.

6. The cleaner of claim 5, further comprising a first filter located between the barrier through-hole and the case intake port to filter the air.

7. The cleaner of claim 6, further comprising:

a housing through-hole provided to pass through the upper surface of the housing;

an upper cover detachably provided in the housing to open or close the housing through-hole and provided with the exhaust port; and a second filter located between the case exhaust port and the upper cover to filter the air, filtering particles smaller than those filtered by the first filter.

8. A cleaner comprising:

a housing having a hollow cylinder shape;

a barrier for dividing an inner space of the housing into an upper space and a lower space;

a barrier through-hole provided to pass through the barrier such that the upper space and the lower space are communicated with each other;

an intake unit provided on a circumferential surface of the housing to communicate the lower space with the outside of the housing;

an exhaust unit provided to pass through the housing such that the upper space is communicated with the outside of the housing;

a fan provided in the upper space to move the air supplied from the barrier through-hole to the exhaust unit;

a housing outlet communicated with the lower space by passing through a bottom surface of the housing;

a cover detachably provided in the housing, closing the housing outlet;

chamber bodies provided in a hollow cylinder shape and extended from the barrier toward the housing outlet, dividing the lower space into a first chamber communicated with the intake unit and a second chamber communicated with the barrier through-hole;

a body barrier dividing the second chamber into a first space communicated with the barrier through-hole and a second space communicated which is not communicated with the barrier through-hole;

a communication hole provided to pass through the chamber bodies, communicating the first space with the first chamber;

a path body provided as a pipe surrounding the barrier through-hole, having one end fixed to the barrier and the other end located in the second space by passing through the body barrier;

a discharge pipe provided as a pipe extended from the barrier through-hole toward the body barrier and located inside the path body;

an inlet provided to pass through the path body, guiding the air inside the second chamber to the inside of the path body;

an air flow forming portion provided between the discharge pipe and the path body in a screw shape, rotating the air entering the inlet, inside the path body; and a storage unit, wherein the storage unit includes:

a storage body provided in a hollow cylinder shape and detachably provided in the housing;

a body inlet provided to pass through an upper surface of the storage body and communicated with the housing outlet; and a communication pipe extended from a bottom surface of the storage body toward the body inlet, dividing an inner space of the storage body into a first storage space communicated with the first chamber and a second storage space communicated with the second space, and wherein the fan includes:

a case provided in the upper space;

an impeller rotatably provided inside the case;

a motor fixed to the case, rotating the impeller;

a case intake port provided on one surface of the case headed for the barrier through-hole, allowing the air to enter the case; and a case exhaust port provided on one surface of the case headed for the exhaust unit, discharging the air inside the case.

* * * * *